(12) United States Patent
Parra

(10) Patent No.: US 6,597,126 B1
(45) Date of Patent: Jul. 22, 2003

(54) HIGH-FREQUENCY, BALLAST-FREE, NON-THERMIONIC FLUORESCENT LIGHTING SYSTEM FOR COLD ENVIRONMENTS

(76) Inventor: Jorge M. Parra, 10721 Skyhawk Dr., New Port Richey, FL (US) 34654

(*) Notice: Subject to any disclaimer, the term of this patent is extended or adjusted under 35 U.S.C. 154(b) by 0 days.

(21) Appl. No.: 09/863,769

(22) Filed: May 24, 2001

Related U.S. Application Data

(60) Provisional application No. 60/206,796, filed on May 25, 2000.

(51) Int. Cl.$^7$ .......................... H05B 37/00; F21V 33/00
(52) U.S. Cl. ........................ 315/209 R; 362/92
(58) Field of Search .................. 315/209 R, 224, 315/225, 226, 307, 314, DIG. 2, DIG. 5; 362/91, 92, 93, 94, 276, 260

(56) References Cited

U.S. PATENT DOCUMENTS

| | | | | |
|---|---|---|---|---|
| 4,487,030 A | * | 12/1984 | Carter et al. | 62/141 |
| 4,490,986 A | * | 1/1985 | Paddock | 62/127 |
| 5,065,074 A | * | 11/1991 | Hesketh et al. | 315/209 R |
| 5,262,704 A | * | 11/1993 | Farr | 318/434 |
| 5,309,066 A | * | 5/1994 | Ditlevsen | 315/205 |
| 5,313,142 A | * | 5/1994 | Wong | 315/205 |
| 5,555,189 A | * | 9/1996 | Yamazato et al. | 700/286 |
| 5,578,753 A | * | 11/1996 | Weiss et al. | 73/335.02 |
| 5,909,950 A | * | 6/1999 | Seok et al. | |
| 6,034,485 A | | 3/2000 | Parra | 315/209 R |
| 6,222,322 B1 | * | 4/2001 | Stack | 315/119 |
| 6,300,722 B1 | * | 10/2001 | Parra | 315/209 R |
| 6,314,745 B1 | * | 11/2001 | Janke et al. | 62/137 |

* cited by examiner

Primary Examiner—Don Wong
Assistant Examiner—Minh D A
(74) Attorney, Agent, or Firm—Jim Zegeer

(57) ABSTRACT

A lighting system for cold environments which comprises a source of DC voltage, a high-frequency, square-wave alternating current generator connected to the source of DC voltage, and one or more fluorescent lamps non-thermionically connected to the square-wave alternating current voltage generator.

4 Claims, 4 Drawing Sheets

HIGH-FREQUENCY, BALLAST-FREE, NON-THERMIONIC FLUORESCENT LIGHTING SYSTEM FOR COLD ENVIRONMENTS

REFERENCE TO RELATED APPLICATION

The present application is the subject of provisional application Ser. No. 60/206,796 filed May 25, 2000 entitled REFRIGERATOR/FREEZER FLUORESCENT LIGHTING SYSTEM.

BACKGROUND AND BRIEF DESCRIPTION OF THE PRIOR ART

In the past, the majority of refrigerator/freezer lighting systems incorporated incandescent lamps. Incandescent lamps heat up the interior of the refrigerator thereby decreasing the efficiency, and also have to be replaced frequently.

BRIEF SUMMARY OF THE INVENTION

In my U.S. Pat. No. 6,034,485, I disclose lighting systems in which high-frequency, ballast-free, square-wave drivers are utilized to non-thermionically initiate and maintain discharges in lighting systems. In my application Ser. No. 08/942,670, filed Oct. 2, 1997, I disclose fluorescent lighting systems which use my ballast-free, non-thermionic high-frequency AC square-wave driver system which start and operate fluorescent lamps without significant change in voltage. These non-thermionic driver systems do not use heated filaments, and, surprisingly, it has been found that they are efficient in starting and operating in cold temperatures and provides more efficient cold environment lighting systems.

The present invention adapts the non-thermionic high-frequency (40 kHz to 120 kHz) alternating current drivers to start and operate lighting systems for cold environments such as refrigerator/freezers, walk-in coolers, cold food display cases, etc.

The invention provides a cold environment fluorescent lamp lighting system for refrigerators, freezers, display cases, walk-in coolers, etc. comprising a circuit for generating a high-frequency (40 kHz–120 kHz) alternating current voltage waveform, and a circuit for non-thermionically applying in a ballast-free manner the high-frequency alternating current voltage waveform to lamp electrodes to start and operate the lamp(s). The high-frequency alternating current voltage waveform as applied to the lamp electrodes is configured to reverse the polarity of the alternating current voltage at the lamp electrodes more rapidly than the pattern of electron and ion density in the gaseous medium can shift.

Thus, the object of the invention is to provide an improved cold environment lighting systems.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
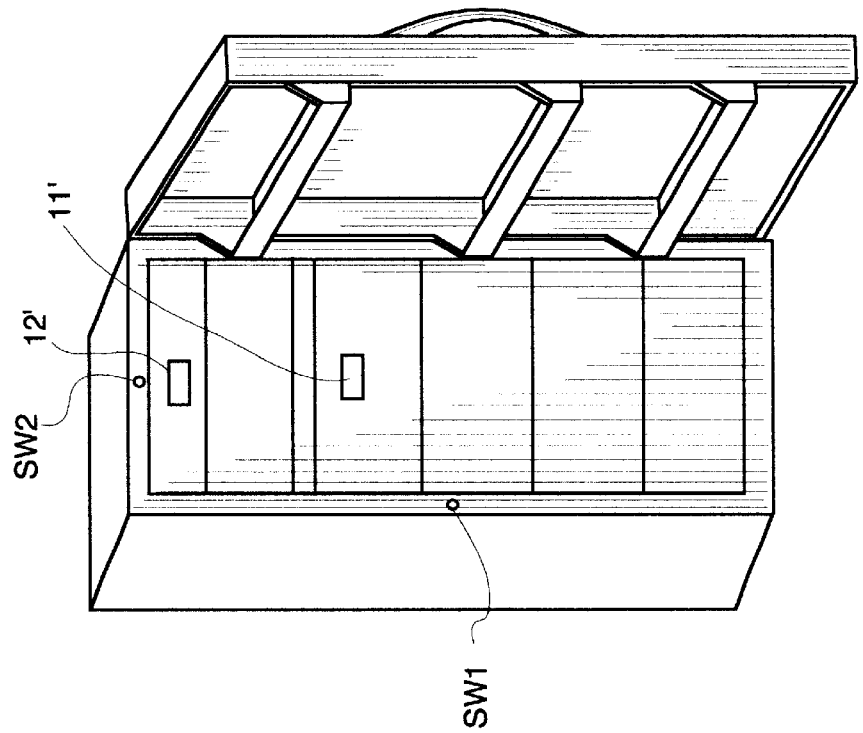
FIG. 1A is an isometric view of a side-by-side refrigerator/freezer incorporating the invention.
Figure 1B:
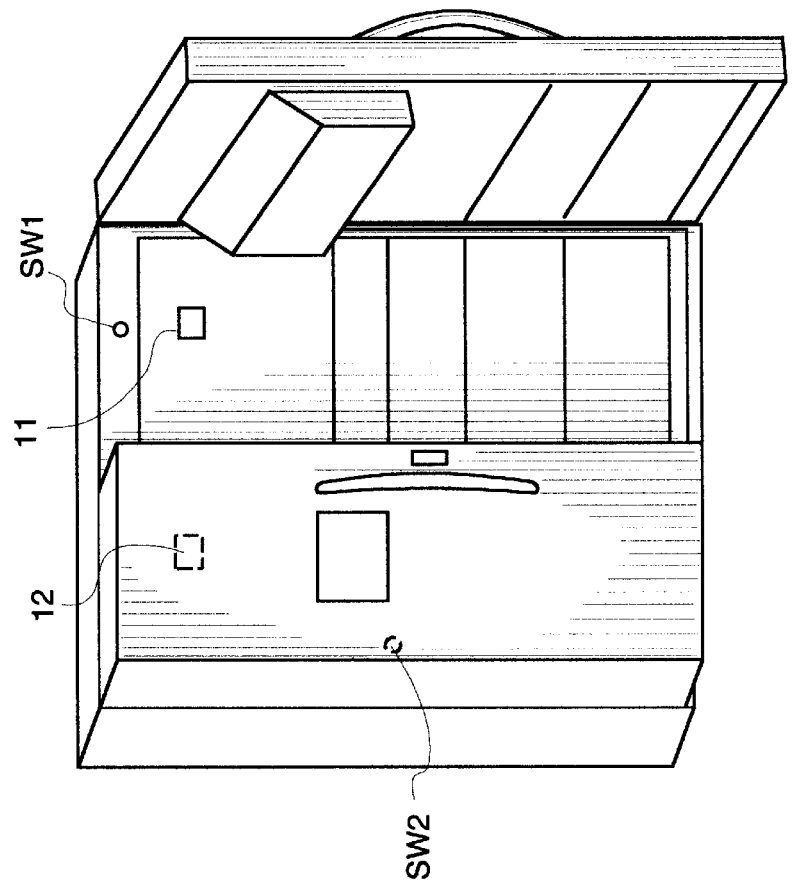
FIG. 1B. is an isometric view of a two-door refrigerator/freezer incorporating the invention.
Figure 4:
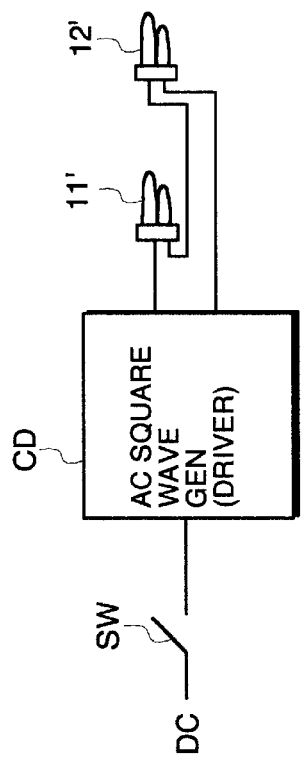
FIG. 4 is a block diagram of a further embodiment of the circuit for driving the compact fluorescent lamp.
Figure 3:
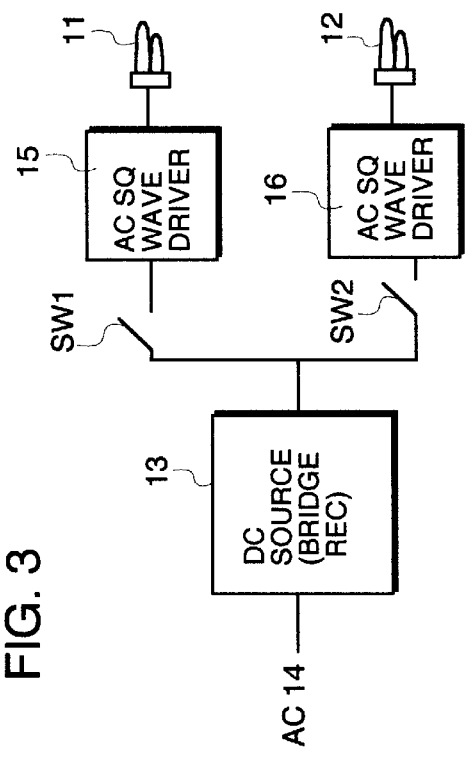

Referring to FIGS. 1A and 1B, the side-by-side freezer/refrigerator of FIG. 1 has a compact fluorescent lamp (CFL) 11 in the refrigerator side RS and a similar compact fluorescent lamp 12 in the freezer side. FIG. 3 shows a block diagram of the driver circuit. In this diagram, a bridge rectifier 13 may be connected to the AC supply 14 and supplies direct current power to a pair of non-thermionic alternating current square-wave drivers 15 and 16 which are used to drive the compact fluorescent lamps 11 and 12, respectively upon actuation of switch SW1 or SW2. As shown in FIG. 4, a common non-thermionic square-wave alternating current driver can be used to drive both lamps. Moreover, each driver 15 and 16 may be incorporated in the base of the compact fluorescent lamps 11 and 12, respectively. Since the square-wave alternating current driver circuits 14 and 15 are effective to start the fluorescent lamp at freezing temperatures (0° C., 32° F.) and run cooler since they are non-thermionic, there is no heating of the refrigerator compartment due to the operation of the lamps.

In a preferred embodiment, the frequency of the AC square-wave voltage frequencies from the square-wave driver are in the range of about 40 kHz to 120 kHz and specifically about 40 kHz to about 100 kHz, but other frequencies may be used.

In FIG. 3, switches S1 and S2 are open and closed by the opening and closing of the refrigerator or the freezer doors of the refrigerator/freezer unit.

Figure 6:
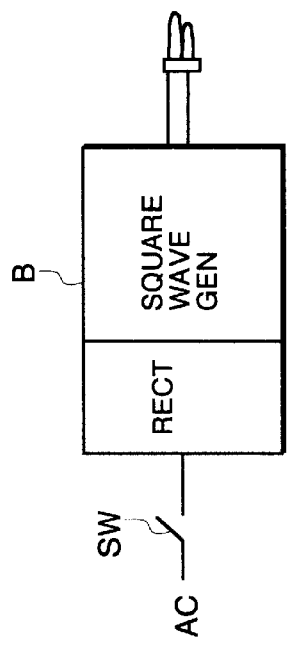
FIGS. 5 and 6 illustrate further embodiments of the invention.
Figure 5:
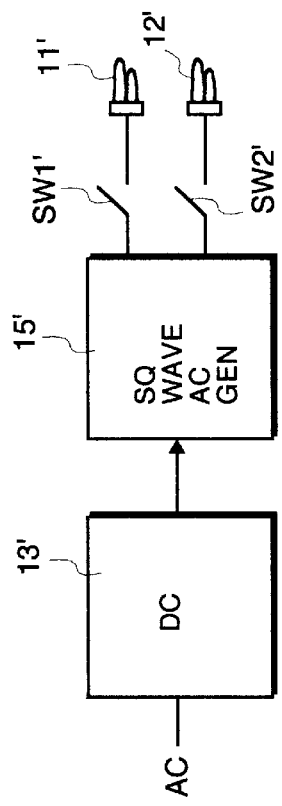

As shown in FIG. 5, the driver circuits can be located outside the cooled space, or as shown in FIG. 6, the rectifier-driver circuit can be located in the base B of a compact fluorescent lamp 11".

While in the preferred embodiment, compact fluorescent folded U-tubes or helical spiral-type fluorescent tubes or linear or any configuration are preferred for refrigerators/freezers, the invention is applicable to any shape or configuration of gas discharge or fluorescent lighting adapted for refrigerator and/or freezer compartments. The tubes 11, 12 can be shaped to fit the refrigerator/freezer space. Moreover, two or more tubes 11, 12 can be serially connected and driven by a single square-wave driver 15 as indicated in FIG. 5.

Figure 7:
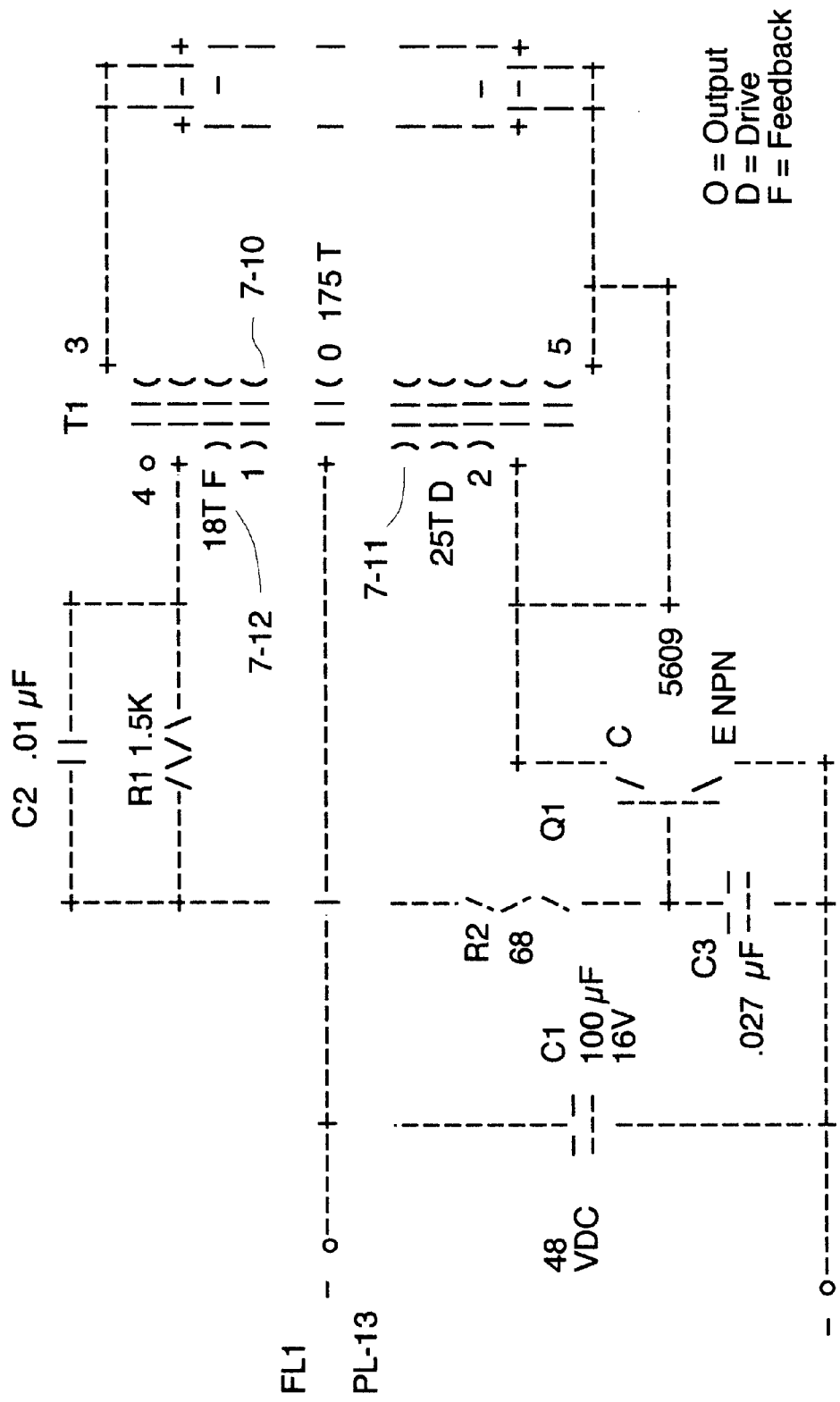
FIG. 7 is a circuit diagram of a preferred embodiment of a refrigerator fluorescent lighting driver circuit.

Referring now to FIG. 7, a square-wave driver circuit particularly adapted for driving a refrigerator/freezer fluorescent lamp is illustrated. The direct current output DC input to the circuit is derived from a step full-wave rectifier (not shown) stepped down by a resistive voltage divider (not shown) and filtered by filter capacitor C1. Transformer T1 is an E-core ferrite transformer. Transformer T i has an output winding 7–10(175 turns of No. 36 AWG), a drive winding 7–11 (25 turns of No. 36 AWG), and a feed-back winding 7–12 (18 turns of No. 36 AWG). The output winding 7–10 is wound first followed by the drive winding 7–11 and then the feed-back winding 7–12. A Mylar® insulated strip or tape is inserted between each of the windings. Feedback to the base of oscillating transistor NPN 7–15 is by feedback resistor R1 paralleled by feedback capacitor C2, dropping resistor R2 and capacitor C3. The lower end 5 of output winding 7–10 is connected to the lower end 2 of drive winding 7–11. The base of the oscillating transistor Q 1 is tied to the midpoint between resistor R2 and capacitor C3. In operation, when DC power is applied, between the common point between drive winding 7–11 and feedback winding 7–12 and emitter EOM transistor Q1, the feedback loop to the transistor Q1 causes it to move between saturation and cut-off. Resistor R2 can be varied in order to ensure the output of the square-wave by biasing the transistor Q1 between saturation and cut-off. The output of the circuit is a square-wave voltage at a frequency of about 48 kHz.

Figure 2A:
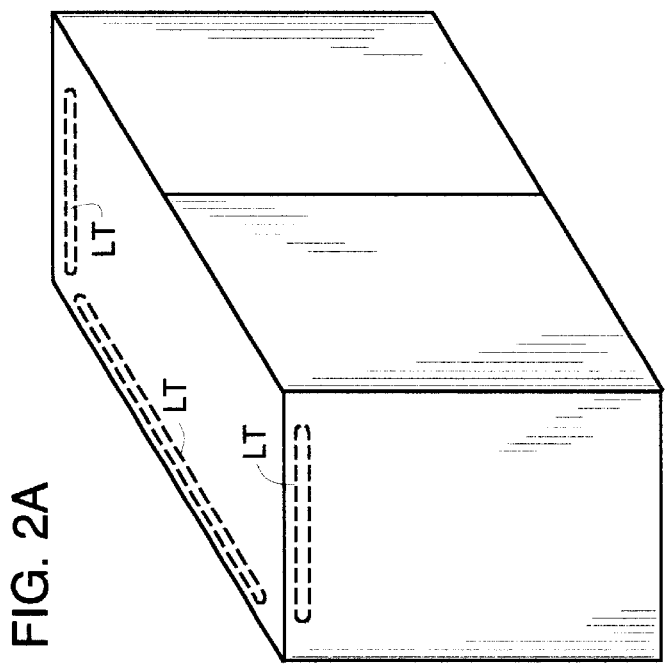
FIG. 2A is an isometric diagrammatic illustration of a walk-in cooler as may be found in a restaurant, meat-packing house and the like, FIG. 2B is a schematic illustration of a cold food display case that may be found in grocery stores, supermarkets and the like, FIG. 3 is a block diagram of a non-thermionic square-wave driver circuits and compact fluorescent lamp driven thereby.
Figure 2B:
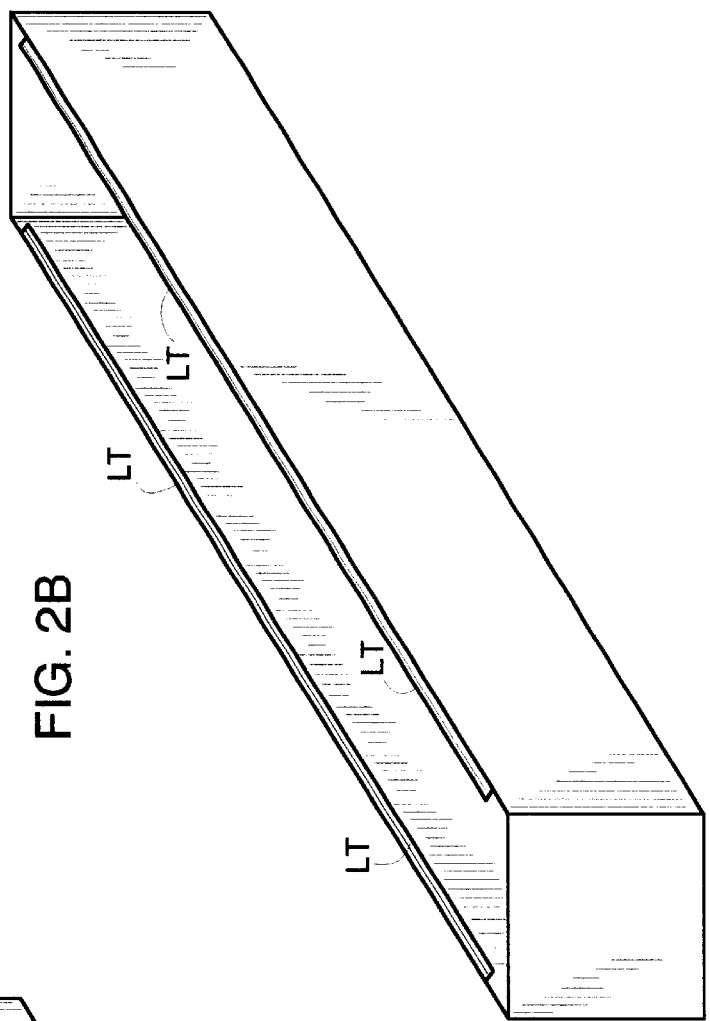

For the larger fluorescent tubes requiring more power (such as the long tubes LT used in the walk-in cooler of FIG. 2A or display cases of FIG. 2B, square-wave driver circuits of the type shown in my above-identified patent can be used.

One or a series of fluorescent lamps is connected across the output terminals 0–3, 0–5, and for refrigerators/freezers, the oscillation frequency can be from about 40 kHz to about 120 kHz.

While the invention has been described in relation to preferred embodiments of the invention, it will be appreciated that other embodiments, adaptations and modifications of the invention will be apparent to those skilled in the art.

What is claimed is:

1. A method of starting and operating a fluorescent lamp discharge system in a cold environment having a gas discharge device with spaced electrodes immersed in a gas comprising: providing a high-frequency alternating current voltage waveform from a source having a frequency range of 40 kHz to 120 kHz, and non-thermionically and in a ballast-free manner, applying the high-frequency alternating current voltage from the source to the lamp, the high-frequency alternating current voltage having a waveform as applied to the lamp which is configured to reverse the polarity of the alternating current voltage as applied to the lamp more rapidly than the pattern of electron and ion density in the gas can shift.

2. A lighting system for cold environments comprising a high-frequency alternating current voltage waveform source having a frequency range of 40 kHz to 120 kHz and one or more fluorescent lamps, means non-thermionically and in a ballast-free manner connecting the high-frequency alternating current voltage from the source to said fluorescent lamps, the high-frequency alternating current voltage having a waveform as applied to the lamp which is configured to reverse the polarity of the alternating current voltage as applied to the lamp more rapidly than the pattern of electron and ion density in the gas can shift.

3. The lighting system defined in claim 2 wherein said cold environment if a refrigerator/freezer having doored compartments and switch means operated by selectively opening and closing of the door of said refrigerator and/or freezer compartment, respectively, for energizing said fluorescent lamps with said high-frequency alternating current.

4. The lighting system defined in claim 2 wherein said high-frequency is about 48 kHz.

* * * * *